Dec. 27, 1960     H. THIEDE     2,966,655
ARRANGEMENT FOR THE MAP-LIKE REPRESENTATION OF THE
POSITION AND SHAPE OF REFLECTING OBJECTS
Filed March 28, 1955
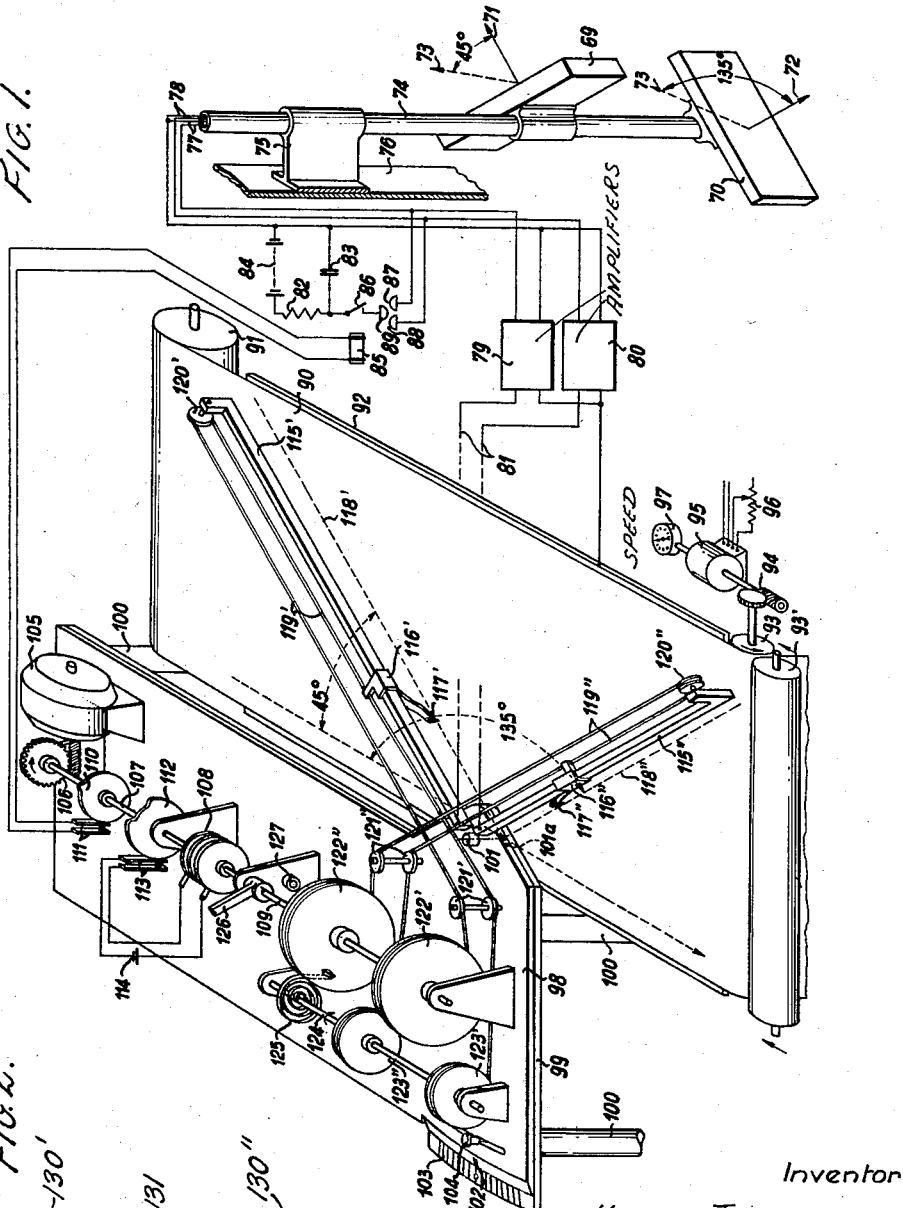
Inventor
HEINZ THIEDE
BY EZEKIEL WOLF
HIS ATTORNEY

United States Patent Office 2,966,655
Patented Dec. 27, 1960

2,966,655

ARRANGEMENT FOR THE MAP-LIKE REPRESENTATION OF THE POSITION AND SHAPE OF REFLECTING OBJECTS

Heinz Thiede, 97 Wachmann Str., Bremen, Germany

Filed Mar. 28, 1955, Ser. No. 497,306

5 Claims. (Cl. 340—3)

This invention relates to a system for mapping by echo location the positions of objects in a substantially horizontal expanse of sea or situated on the seabed in shallow water. The system is installed on board a ship and intended for use during the ship's travel, the result being a continuous map-like record of the positions of objects in strip form. The invention relates more particularly to a system comprising two or more directional transducers mounted on the ship and having invariable substantially horizontal directions of radiation more or less abeam of the ship for scanning the sea lateral of the ship's course during and consequent to the ship's travel.

Each of the transducers periodically transmits directed sound pulses, which after reflection from objects, are directionally received by the same transducer. The received pulses are amplified and applied to a recording stylus moving periodically and in synchronism with pulse transmissions across a recording strip in a straight line. This line is oriented at the same angle with the inverse direction of the feed of the paper strip as that made by the direction of radiation of the transducer with the heading of the ship. The stylus is deflected with uniform velocity, commencing from always the same initial position on the transmission of each pulse. Markings are produced in response to reflected pulses at points along said straight line relative to the stylus starting point indicative of the positions of objects relative to the instantaneous position of the ship. As the ship progresses and the recording strip is advanced correspondingly, a continuous map of plan-position picture of objects in the sea is produced.

In order to obtain an undistorted or conformal mapping of objects relative to the path of the ship through the water, the recording strip is advanced in proper relationship to the speed of the vessel, the stylus velocity, and the velocity of sound in water.

This is important for properly superimposing markings produced by repeated scannings of the same object at different times as the ship progresses along its journey.

In one embodiment of the invention for covering a broad expanse of the sea, there may be provided two fixedly mounted transducers characterized by radiation patterns directed from the starboard and port sides of the ship and oriented substantially at right angles to the fore-and-aft line of the ship in combination with a rotatable transducer characterized by a radiation pattern confined essentially to a narrow region in the horizontal plane. The rotatable transducer is recurrently rotated through a forward sector, thereby covering a strip of the sea in between the strips covered by the lateral transducers. Appropriate echo recording means are associated with each transducer, these means being arranged for recording received reflected pulses in places on the recording strip corresponding to the actual configuration of the reflecting objects in the sea.

According to a further embodiment of the invention, there is provided on one or both sides of the ship, two or more directional transducers characterized by horizontal radiation patterns pointing generally in either the starboard or port directions, respectively, and oriented at different angles with respect to the heading of the ship. When the ship is underway, the beams of the different transducers on one side of the ship successively scan consecutive segments of the same strip of water or seabottom relative to the course of the ship. For each transducer, a recording stylus is provided which is guided along a straight line angularly oriented with respect to the inverse direction of the paper feed at the same angle as the direction of radiation of the associated transducer with respect to the heading of the ship. The guiding lines of the different styli issue from a fixed point corresponding to the instantaneous position of the ship on the continuously displayed and developing plan-position picture. An echo pulse is recorded each time a scanning beam encounters an object. By arranging and operating the recording means to effect conformal mapping, different markings corresponding to the same object occur at the same spot on the recording strip due to the geometric similarity.

The multiple scanning of an obstacle as provided, for example, by the further embodiment referred to above is advantageous because its image can be better distinguished from spurious recordings caused by interference since the superposition of a number of markings produces an intensified image. The markings due to interference occur irregularly and will not coincide generally. The superposition of a plurality of images of the same obstacle furthermore has special advantages when the obstacles are large. The surfaces of such obstacles reflecting energy back to the ship and the intensity of such pulses depends on the position of the bounding surfaces with respect to the direction of incident search pulses. Thus, bounding surfaces lying in the shadow of the transmitted sound pulses are not represented in the displayed picture. A better and more complete representation of an obstacle is therefore obtained when scanned by beams from at least two directions as widely variant as possible, and superimposing the received echo images on the same display.

The present invention contemplates and has as an important object the provision of a recorder for presenting a visual representation of an obstacle obtained in response to reflected energy from pulses striking the obstacle from different directions and superimposing the visual representation of the received echo on a common display.

Furthermore, an object of the invention is the production of a continuous, conformal map picture, which is uniformly reduced in all directions, of a strip of the sea-bed or of a substantially two dimensional water body parallel to the course of a ship, whether to port, to starboard, or on both sides of the ship.

The invention also further provides for the use of a plurality of directed transducers having directions rigidly set in the horizontal plane and mounted on a moving ship for the purpose of sweeping a strip parallel to the course by transmitted pulses.

The invention also provides for the use of one or a plurality of oscillators having a periodically changing beam direction for the same purpose.

The invention further provides for the combination of oscillators with rigidly set beam direction and of oscillators with a beam direction rocking in the horizontal plane, for the purpose of sweeping adjoining parallel strips.

In order that the invention may be more readily understood, reference is made to the accompanying drawings which illustrate diagrammatically and by way of example, several embodiments thereof, and in which:

Fig. 1 is an arrangement for the continuous scanning of a strip of the horizontal plane parallel to the course of a travelling ship by means of two oscillators having different fixed beam directions;

Fig. 2 is a diagram showing the scanning of a strip by means of two displaced search beams.

An embodiment of the invention intended for recording obstacles in a strip parallel to the ship's course on one side of the ship only, shown in the drawings as the starboard side of the ship, is illustrated in Figs. 1 and 2. In this embodiment each obstacle within the range is struck twice from different directions by two search beams, the direction of each being in fixed relationship to the longitudinal axis of the ship. The number chosen here by way of example, of two search beams can also be increased in order to utilize to a greater extent the hereinbefore mentioned advantages of a repeated scanning of obstacles. Two transducers 69, 70 of the magnetostrictive type directionally transmit and receive pulses. Their beam width in the horizontal plane is about 1 degree and somewhat more in a vertical plane.

The beam directions 71, 72 form angles of 45 degrees and 135 degrees respectively with the forward direction 73. A tube 74 carrying the transducers 69, 70 is fastened to the side of a ship 76 by means of a bracket 75 so that the transducers are situated some feet below the surface of the water. Connecting cables 77, 78 of the transducers are passed to two separate amplifiers 79, 80 the outputs of which are connected to the recorder through leads 81.

The transducers are shock-excited. A condenser 83 of 4 microfarads is charged to 2000 volts from a voltage source 84 through a resistance 82. On energization of a relay 85 a contact 86 is closed and the condenser 83 discharges via two spark gaps 87, 88, which have a common electrode 89, and via the cables 77, 78 through the windings of the magnetostrictive transducers 69, 70, which perform a damped oscillation and at the same time transmit two sound wave pulses in different directions.

The recordings are effected on a continuous paper strip 90, which is unwound from a supply roll 91, runs over a platen 92, and is driven by friction by a roller 93 against which it is pressed by a spring-loaded roller 93'. The roller 93 is driven, through a gear 94 by a motor 95 with regulator 96 and revolution indicator 97, at adjustable speed.

In the following description similar parts of the recorder are denoted by the same numerals, those appertaining to the transducer 69 being once primed and those for the transducer 70 twice. The recording mechanism proper is carried by a plate 98, which rests on a second plate 99 supported by columns 100. The two plates are rotatably connected by a pin 101, the center line of which intersects the paper surface 90 at the point 101a. A pointer 102 indicates on a scale 103 the angle by which the plate 98 is turned in relation to its zero position. A knurled screw 104 serves for locking the plate 98. A motor 105 running at uniform speed is fastened to the plate 98, and through a gear 106 drives a shaft 107, which can be connected to a second shaft 109 through a magnetic clutch 108.

The continuously rotating shaft 107 makes one revolution in 1.3 seconds. A cam 110 attached thereto operates a pair of contacts 111 on each revolution of the shaft, whereby the relay 85 is momentarily energized. A second cam 112 closes, simultaneously with the pulse emission, a pair of contacts 113 for approximately 1 second, whereby the magnetic clutch 108 is energized from a voltage source 114 and couples the shaft 109 for the same period to the continually rotating shaft 107.

Two square guide bars 115', 115", the center lines of which pass through the axis 101 are insulatedly mounted on the plate 98. In the normal position of the plate 98, as indicated by the pointer 102 and the scale 103, these bars enclose angles of 45 degrees and 135 degrees respectively with the negative direction of the paper feed. On the bars slide sleeves 116', 116", to which are attached styli 117', 117" which run over the paper 90 along the path 118', 118". The sleeves 116', 116" are moved along the bars 115', 115" by cords 119', 119", which are connected to the sleeves and which run over guide rollers 120', 120", 121', 121". One end of each of the cords is respectively attached to drums 122', 122", which are connected to the shaft 109 and which, on rotation, wind up the cord, whereby they move the styli outward from point 101a on the paths 118', 118". The two other ends of the cords 119', 119" are respectively wound on two drums 123', 123", which are fastened on a shaft 124. A tensioned spiral spring 125 which is connected to this shaft and which tends to rotate the shaft 124 in a clockwise direction, holds the cords taut and effects the return of the styli into their starting position at point 101a, as soon as magnetic clutch 108 is increased. An arm 126 which is rigidly connected to the shaft 109 and which strikes against a rubber buffer 127 from one side or the other, limits the rotation of the shaft 109 to an angle of $$\frac{1 \times 360}{1.3} = 277 \text{ degrees}$$

The diameter of the drums 122', 122" is so selected that on a rotation of the drums through this angle the styli are traversed through the entire length of their track, the length of which amounts to 150 millimeters. This movement takes place during a period of time of 1 second, so that the styli are moved at a speed of 150 millimeters per second.

In operation, the transmission of sound pulses by the oscillators 69, 70 is effected at intervals of 1.3 seconds by the closing of contacts 111. The amplifiers 79, 80 which are continually connected through cables 77, 78 to the transducers and which have at their input an arrangement of known kind for protection against the high transmitting voltage, amplify the reflected pulses received by the transducers, which pulses are then supplied, through leads 81 and the metal bars 115', 115", to the moving styli 117', 117". If in their initial position the styli are not situated exactly at the point 101a, but at a slight distance therefrom, the beginning of their outward movement along the tracks 118', 118" will be correspondingly shifted in time in relation to the pulse emission. The starting of the styli is effected by the closing of the contacts 113, whereby the magnetic clutch 108 is energized and the shaft 109 with the drums 122', 122" is driven by the shaft 107 from the position of rest determined by the arm 126 and the stop 127. The drums 122', 122" wind up the one end of the cords 119', 119", while the other end is unwound from the spring tensioned drums 123. After one second, the styli having reached a distance of 150 millimeters from the point 101a, the arm 126 runs against the stop 127 and at the same time the contacts 113 open, whereby the connection of the shafts 107 and 109 is broken. By the action of the spring 129 the drums 123', 123" now again wind up the cords 119', 119", whereby the styli are rapidly returned to their starting position. This is reached when the arm 126 contacts the stop 127.

During the travel of the ship upon a straight line course, the configuration of the search beams 71 and 72 undergoes a parallel translation. In Fig. 2 128 denotes the direction of travel of the ship 129 and various positions occupied by the two search beams during the forward movement of the ship are shown at 130' and 130". As is seen, an obstacle 131 is struck by beams twice from different directions when the ship passes through the points 129 and 129a, the stylus 117' and 117" respectively producing a recording. In order that the desired improvement of the representation may be obtained by the double recording, both recordings must take place at the same point of the recording strip 90. This is the case in the described arrangement, when the paper speed is reduced in the same ratio in relation to the speed of travel of the ship as is the stylus speed in relation to half the velocity of sound in water.

Given an assumed speed of travel of 6 knots=3.09 meters per second, a paper speed of $3.09 \cdot 150/_{750}$ or 0.00062 meter per second must be set. In order to facilitate the correct setting of the paper feed speed by means of the regulator 96, the revolution indicator 97 has a scale indicating the value of the ship's speed in knots corresponding to different paper speeds. Means operated by a log may be provided for automatically regulating the paper speed to be in the desired ratio to the ship's speed.

In the case of a wind or current drift the plate 98 is rotated through an angle such that the angles enclosed by the stylus paths 118', 118'' with the negative direction of the paper feed are equal to the angles formed by the beam directions 71, 72 with the true course by setting pointer 102 to the drift angle on scale 103.

If obstacles floating in the water are to be observed, then the true course through the water, which can be ascertained for example with pressure-head speed indicators is taken as a basis for the setting on the scale 103 and on the instrument 97. If, on the other hand, obstacles situated on the sea-bed are to be represented, then the true ground course must be used, which can be ascertained from the Doppler frequency shift undergone on diffuse reflection by sound waves constantly transmitted in two directions at right angles to one another and inclined towards the sea-bed.

A particular advantage of the use of rigidly set search beams according to Fig. 1 in relation to the use of an oscillating search beam is that the pulses can be transmitted at shorter intervals since the time required for the rotation of the oscillator and during which no pulses can be transmitted or received, is eliminated. The higher the pulse repetition rate may be made, the better is the representation obtained. A representation of the horizontal expanse of the sea-bed with an arrangement according to Fig. 1 presupposes that the search beams are inclined only moderately in relation to the sea-bed and, in order that the search beams strike the sea-bed at not too great a distance from the ship the sea depth must be only a fraction of the range. Generally, an adequately undistorted representation of the sea-bed is obtained for distances where the search beams strike the sea-bed at an angle of less than 10 to 20 degrees from the horizontal. When scanning the sea-bed with an arrangement according to Fig. 1 with rigidly directed transducers assuming the water depth to be 30 meters, a strip between approximately 100 to 500 meters distance from the course line of the ship is depicted.

If fixedly directed transducers according to Fig. 1 are provided on both sides of the ship, multiple scanning is obtained on both sides of the ship and two such strips are depicted, between which a strip of 200 meters width, in the middle of which runs the course line, remains unswept. For the purpose of depicting this remaining strip, an additional rotatable transducer for scanning a sector pointing in the forward direction and associated recording means can be provided. According to the invention all the recordings are effected on the same moving strip of paper in such manner that they combine into a unitary picture of a broad strip of the sea-bed.

What I claim is:

1. Apparatus for providing a map-like representation of the position and shape of reflecting objects with respect to the rectilinear course being followed by a vessel at a measurable speed, comprising, pulse transmitting and receiving means aboard said vessel, a plurality of electroacoustic transducers mounted on said vessel, each of said transducers characterized by a radiation pattern sharply directed in the horizontal plane, each of said patterns being differently oriented in the horizontal plane with respect to the longitudinal axis of said vessel and each lying on the same side of a vertical plane including said axis, a strip of recording medium for visually displaying said map-like representation, respective marking means associated with each of said transducers, means for imparting relative motion between said recording medium and all said marking means in a first direction corresponding to said rectilinear course, means for imparting relative movement between each of said marking means and said recording medium in a direction relative to said first direction corresponding to the orientation of the associated transducer radiation pattern in the horizontal plane with respect to the longitudinal axis of said vessel, means for initiating the latter movement from a point opposite said medium corresponding to the instantaneous position of said vessel when a pulse is emitted by said pulse transmitting means, a source of a signal representative of the true speed of said vessel, and means responsive to the signal from the latter source for effecting said latter movement at a substantially constant velocity which bears the same ratio to one-half the velocity at which energy emitted by said transducers travels through the medium in which said vessel is moving as the velocity in said first direction bears to the true speed of said vessel.

2. Apparatus in accordance with claim 1 wherein said recording medium is electrosensitive paper moving at a speed corresponding to that of said vessel, and said marking means includes a stylus associated with each transducer.

3. Apparatus in accordance with claim 2 and further comprising, stylus guide means each of which is associated with one of said styli for guiding the associated stylus along said direction relative to said first direction, and said receiving means includes separate means for applying echo signals from a respective transducer to its associated stylus.

4. Apparatus for providing a map-like representation of the position and shape of reflecting objects with respect to the course being followed by a vessel comprising, a plurality of directional transducers on the same side of said vessel, each of said transducers characterized by a directive horizontal radiation pattern pointing away from said same side, each of said patterns being oriented at different angles with respect to the heading of said vessel, means for successively scanning consecutive segments of the same volume relative to said course with pulsed energy to provide echo pulses travelling toward said vessel from reflecting objects, a plurality of recording styli each associated with a respective one of said transducers, means for providing a marking pulse to each stylus when an echo pulse arrives at the associated transducer from a direction in which the horizontal pattern of the latter transducer is then oriented, a recording medium, means for imparting relative movement between said recording medium and said styli along a first line of direction corresponding to the course of said vessel, means for guiding each stylus along a straight line angularly oriented relative to said first line of direction in accordance with the angle of the horizontal directional pattern orientation of the associated transducer with respect to said vessel heading and beginning from a point on said line of direction corresponding to the contemporary position of said vessel, and means responsive to said marking pulses for causing the respective styli to mark said medium at a distance with respect to said point corresponding to the distance between a respective transducer and the object from which an echo pulse received thereby is reflected to provide said map-like representation.

5. Apparatus in accordance with claim 2 and further comprising, a second plurality of said transducers disposed upon the other side of said vessel, and a second plurality of said styli each associated with a respective one of said second plurality of transducers for providing a map-like representation on said recording medium of objects on both sides of the course being followed by said vessel.

References Cited in the file of this patent

UNITED STATES PATENTS

| 2,430,307 | Smith | Nov. 4, 1947 |
| 2,759,783 | Ross | Aug. 21, 1956 |
| 2,825,884 | Fryklund | Mar. 4, 1958 |

FOREIGN PATENTS

| 822,515 | Germany | Nov. 26, 1951 |
| 874,423 | Germany | Oct. 26, 1953 |